(12) United States Patent
Miyamoto et al.

(10) Patent No.: US 8,901,053 B2
(45) Date of Patent: Dec. 2, 2014

(54) AQUEOUS CLEANING COMPOSITION FOR SUBSTRATE FOR PERPENDICULAR MAGNETIC RECORDING HARD DISK

(75) Inventors: Sadaharu Miyamoto, Wakayama (JP); Atsushi Tamura, Wakayama (JP); Yasunori Horio, Wakayama (JP)

(73) Assignee: Kao Corporation, Tokyo (JP)

( * ) Notice: Subject to any disclaimer, the term of this patent is extended or adjusted under 35 U.S.C. 154(b) by 1060 days.

(21) Appl. No.: 12/677,996

(22) PCT Filed: Sep. 5, 2008

(86) PCT No.: PCT/JP2008/066116
§ 371 (c)(1),
(2), (4) Date: Mar. 12, 2010

(87) PCT Pub. No.: WO2009/034933
PCT Pub. Date: Mar. 19, 2009

(65) Prior Publication Data
US 2010/0221417 A1  Sep. 2, 2010

(30) Foreign Application Priority Data
Sep. 14, 2007  (JP) ................. 2007-239156

(51) Int. Cl.
| | | |
|---|---|---|
| B05D 5/00 | (2006.01) | |
| C11D 1/38 | (2006.01) | |
| C11D 1/62 | (2006.01) | |
| C11D 1/75 | (2006.01) | |
| C11D 1/92 | (2006.01) | |
| C11D 1/90 | (2006.01) | |
| C11D 1/88 | (2006.01) | |
| G11B 5/84 | (2006.01) | |

(52) U.S. Cl.
CPC ............... *G11B 5/8404* (2013.01); *C11D 1/62* (2013.01); *C11D 1/75* (2013.01); *C11D 1/92* (2013.01); *C11D 1/90* (2013.01); *C11D 1/88* (2013.01)
USPC ............................. 510/167; 510/405; 427/129

(58) Field of Classification Search
USPC ................................... 427/129; 510/167, 405
See application file for complete search history.

(56) References Cited

U.S. PATENT DOCUMENTS

| | | | | |
|---|---|---|---|---|
| 4,576,743 A | * | 3/1986 | Kita et al. ...................... | 510/171 |
| 4,973,496 A | * | 11/1990 | Kruger et al. .................. | 427/129 |
| 5,954,997 A | * | 9/1999 | Kaufman et al. .............. | 252/79.1 |
| 6,117,220 A | * | 9/2000 | Kodama et al. ................ | 106/3 |
| 6,336,945 B1 | * | 1/2002 | Yamamoto et al. ............ | 51/309 |
| 6,521,535 B2 | * | 2/2003 | Sabia ............................. | 438/691 |
| 6,553,788 B1 | * | 4/2003 | Ikeda et al. .................... | 65/31 |
| 6,736,705 B2 | * | 5/2004 | Benning et al. ................ | 451/41 |
| 7,374,699 B2 | * | 5/2008 | Yamamuro et al. ........ | 252/183.13 |
| 2003/0230552 A1 | * | 12/2003 | Jensen et al. ................... | 216/97 |
| 2004/0072943 A1 | * | 4/2004 | Morihiro et al. .............. | 524/556 |
| 2005/0214701 A1 | * | 9/2005 | Oyamada ....................... | 430/619 |
| 2006/0096496 A1 | * | 5/2006 | Sun et al. ....................... | 106/3 |
| 2007/0003502 A1 | * | 1/2007 | Tanabe et al. ............. | 424/70.13 |
| 2008/0107696 A1 | * | 5/2008 | Czech et al. ................... | 424/401 |

FOREIGN PATENT DOCUMENTS

| | | | | |
|---|---|---|---|---|
| JP | 11-28431 A | 2/1999 | | |
| JP | 2000-144193 A | 5/2000 | | |
| JP | 2000-311336 A | 11/2000 | | |
| JP | 2000-311366 | * 11/2000 | | |
| JP | 2001-3081 A | 1/2001 | | |
| JP | 2003-253298 A | 9/2003 | | |
| JP | 2003-253298 A | * 9/2003 | | |
| JP | 2004-182800 A | 7/2004 | | |
| JP | 2005-97432 A | 4/2005 | | |
| JP | 2005-529056 A | 9/2005 | | |
| JP | 2005312711 A | * 11/2005 | ............. | A47L 13/17 |
| JP | 2008044970 A | * 2/2008 | | |
| WO | WO 98/21289 A1 | 5/1998 | | |
| WO | WO 03/106364 A1 | 12/2003 | | |

OTHER PUBLICATIONS

Japanese Office Action for Application No. 2008-228761 dated Jul. 12, 2012 (with English translation).
Chinese Notification of First Office Action dated May 5, 2011 for Chinese Application No. 200880106838.1.
Chinese Office Action, dated Apr. 6, 2012, for corresponding Chinese Application No. 200880106838.1.

* cited by examiner

*Primary Examiner* — Nicole M Buie-Hatcher
*Assistant Examiner* — M. Reza Asdjodi
(74) *Attorney, Agent, or Firm* — Birch, Stewart, Kolasch & Birch, LLP

(57) ABSTRACT

An aqueous cleaning composition for a substrate for a perpendicular magnetic recording hard disk including a Ni—P containing layer contains at least one surfactant selected from the group consisting of surfactants represented by Formulas (1) to (6) and has a pH at 25° C. of 5 or less.

[Chemical Formula 1]

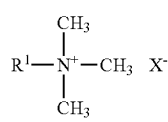

(1)

In Formula (1), $R^1$ is an alkyl group having a carbon number of 10 to 16, and X is a halogen atom.

6 Claims, No Drawings

AQUEOUS CLEANING COMPOSITION FOR SUBSTRATE FOR PERPENDICULAR MAGNETIC RECORDING HARD DISK

TECHNICAL FIELD

The present invention relates to an aqueous cleaning composition for a substrate for a perpendicular magnetic recording hard disk, and a method for producing a perpendicular magnetic recording hard disk using the composition.

BACKGROUND ART

In recent memory hard disk drives, there is a demand for decreasing a flying height of a magnetic head so as to enhance a recording density, thereby reducing a unit recording area, for the purpose of achieving a high capacity and a small diameter. In connection with this, even in a process of producing a hard disk, the surface quality required of a polished surface obtained by polishing an object to be polished is increasing. That is, in accordance with the reduction in flying height of the head, the surface roughness and the micro waviness of the polished surface obtained by polishing need to be reduced, and it is necessary to reduce roll-off (edge rounding of the end side of a substrate) and the number of protrusions. It also is necessary to reduce the number of scratches on the polished surface in accordance with the reduction in a unit recording area, and further, the size and depth of the scratches need to be decreased.

The recording system in a hard disk is shifting from a horizontal magnetic recording system (which also is called an in-plane magnetic recording system) to a perpendicular magnetic recording system along with the request for an increase in a capacity.

The process of producing a horizontal magnetic recording hard disk includes a substrate formation step and a media step. In the substrate formation step, a base is subjected to a polishing treatment and a cleaning treatment in this order a plurality of times, whereby a substrate for a hard disk is produced. In the media step, small unevenness is provided to both principal surfaces of a substrate for a hard disk by polishing (texture step), the substrate is cleaned (cleaning step), and magnetic layers are formed respectively on both principal surfaces of the substrate (magnetic layer formation step). In the texture step, particles adhering to the substrate for a hard disk in the substrate formation step are removed by polishing. In the case where the substrate for a hard disk is, for example, an aluminum substrate having Ni—P containing layers as outermost layers (hereinafter, which may be abbreviated as a "substrate having Ni—P containing layers"), when a cleaning composition with high acidity is used, the Ni—P containing layer is dissolved (corroded) excessively. For this reason, in the cleaning step, only water or an alkaline nonionic surfactant has been used (see, for example, Patent Document 1).
Patent Document 1: JP 2001-003081 A

DISCLOSURE OF INVENTION

Problem to be Solved by the Invention

On the other hand, in the process of producing a perpendicular magnetic recording hard disk, the cleaning step is performed after the substrate formation step without performing the texture step. Particles generated in the substrate formation step adhere to the substrate having Ni—P containing layers without being subjected to the texture step. These particles cannot be removed by cleaning with water or an alkaline nonionic surfactant, performed in the process of producing a horizontal magnetic recording hard disk, and hence, it used to be difficult to obtain a highly cleaned surface.

Therefore, with the foregoing in mind, it is an object of the present invention to provide an aqueous cleaning composition for a substrate for a perpendicular magnetic recording hard disk, which has a high cleaning ability while suppressing the corrosion of a Ni—P containing layer, and a method for producing a perpendicular magnetic recording hard disk using the composition.

Means for Solving Problem

An aqueous cleaning composition of the present invention for a substrate for a perpendicular magnetic recording hard disk including a Ni—P containing layer contains at least one surfactant selected from the group consisting of a cationic surfactant represented by the following Formula (1), an amphoteric surfactant represented by the following Formula (2), an amphoteric surfactant represented by the following Formula (3), an amphoteric surfactant represented by the following Formula (4), an amphoteric surfactant represented by the following Formula (5), and an amphoteric surfactant represented by the following Formula (6), and has a pH at 25° C. of 5 or less.

[Chemical Formula 1]

(1)

In Formula (1), $R^1$ is an alkyl group having a carbon number of 10 to 16, and X is a halogen atom.

[Chemical Formula 2]

(2)

In Formula (2), $R^2$ is an alkyl group having a carbon number of 10 to 16.

[Chemical Formula 3]

(3)

In Formula (3), $R^3$ is an alkyl group having a carbon number of 10 to 16.

[Chemical Formula 4]

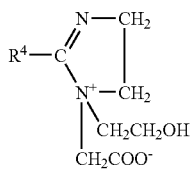
(4)

In Formula (4), $R^4$ is an alkyl group having a carbon number of 10 to 16.

[Chemical Formula 5]

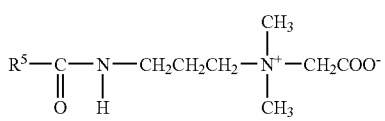
(5)

In Formula (5), $R^5$ is an alkyl group having a carbon number of 10 to 16.

[Chemical Formula 6]

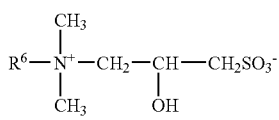
(6)

In Formula (6), $R^6$ is an alkyl group having a carbon number of 10 to 16.

A method for producing a perpendicular magnetic recording hard disk of the present invention is a method for producing a perpendicular magnetic recording hard disk including a substrate for a perpendicular magnetic recording hard disk having Ni—P containing layers as both outermost layers and a magnetic layer placed on one principal surface of the substrate for a hard disk or magnetic layers placed respectively on both principal surfaces of the substrate for a hard disk. The method includes: a substrate formation step of forming the substrate for a hard disk; a cleaning step of cleaning the substrate for a hard disk; and a step of forming at least one of the magnetic layers, wherein the substrate for a hard disk is cleaned using the aqueous cleaning composition for a substrate for a perpendicular magnetic recording hard disk of the present invention in the cleaning step.

DESCRIPTION OF PREFERRED EMBODIMENTS

The inventors of the present invention found the following: a nickel oxide layer is formed on a substrate for a hard disk when the surface of a Ni—P containing layer is oxidized in the air, particles generated in a substrate formation step are cuttings (oxide fine particles) from the polished nickel oxide layer or an oxide of cuttings (oxide fine particles) from the polished Ni—P containing layer, and the oxide fine particles adhere to the nickel oxide layer. Then, the inventors of the present invention considered removing the oxide fine particles by dissolving the nickel oxide layer purposely using a cleaning composition with high acidity, which has been avoided conventionally for the reason that the Ni—P containing layer is dissolved (corroded) excessively, thereby relaxing the adhesion state of the oxide fine particles.

An example of the cleaning composition with high acidity contains, for example, (a) a nonionic surfactant having a cloudy point of 30° C. to 70° C., (b) a cationic surfactant having an ester bond in molecules and being capable of generating aliphatic acid by hydrolysis, (c) an amphoteric surfactant, and (d) water (JP 2005-97432 A). The pH of the cleaning composition at 20° C. is, for example, 0.5 to 6, preferably 1 to 4, and more preferably 2 to 4.

Another example of the cleaning composition with high acidity is, for example, a mixing solution (80° C., pH=5) of commercially available acetic acid and commercially available ammonia water (JP 11 (1999)-28431 A).

After trial and error, the inventors of the present invention found the following: a cleaning composition containing at least one selected from the group consisting of a particular cationic surfactant and a particular amphoteric surfactant, which are not described in JP 2005-97432 A and JP 11 (1999)-28431 A, can suppress the corrosion of a Ni—P containing layer while being capable of removing a nickel oxide layer and oxide fine particles to a degree equal to or higher than that in the case of performing the same treatment as that conducted in the texture step in the process of producing a horizontal magnetic recording hard disk.

The particular cationic surfactant contained in the aqueous cleaning composition for a substrate for a perpendicular magnetic recording hard disk (hereinafter, which may be abbreviated as a "cleaning composition") of the present invention is represented by the following Formula (1).

[Chemical Formula 7]

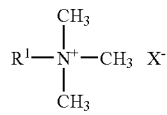
(1)

In Formula (1), $R^1$ is an alkyl group having a carbon number of 10 to 16. However, from the viewpoint of enhancing the solubility of nickel oxide and effectively suppressing the corrosion of a Ni—Pi containing layer, the carbon number is preferably 10 to 14, and more preferably 10 to 12. X is a halogen atom, and examples thereof include Cl, Br, and I.

Specific examples of the cationic surfactant represented by Formula (1) include decyltrimethyl ammonium chloride (C10), undecyltrimethyl ammonium chloride (C11), lauryltrimethyl ammonium chloride (C12), tridecyltrimethyl ammonium chloride (C13), tetradecyltrimethyl ammonium chloride (C14), pentadecyltrimethyl ammonium chloride (C15), and hexadecyltrimethyl ammonium chloride (C16). These cationic surfactants may be used alone or in combination of at least two kinds. Among them, decyltrimethyl ammonium chloride (C10), lauryltrimethyl ammonium chloride (C12), and tetradecyltrimethyl ammonium chloride (C14) are preferred from the viewpoint of enhancing the solubility of nickel oxide, effectively suppressing the corrosion of a Ni—P containing layer, and being readily available industrially, and decyltrimethyl ammonium chloride (C10) and lauryltrimethyl ammonium chloride (C12) are more preferred from the same viewpoint.

An example of the particular amphoteric surfactant is represented by, for example, Formula (2).

[Chemical Formula 8]

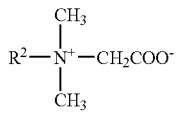
(2)

In Formula (2), $R^2$ is an alkyl group having a carbon number of 10 to 16. However, from the viewpoint of enhancing the solubility of nickel oxide and effectively suppressing the corrosion of a Ni—Pi containing layer, the carbon number is preferably 10 to 14, and more preferably 10 to 12.

The amphoteric surfactant represented by Formula (2) is alkyl dimethylamino acetic acid betaine, and specific examples thereof include decyl dimethylamino acetic acid betaine, undecyl dimethylamino acetic acid betaine, lauryl dim ethylamino acetic acid betaine, tridecyl dimethylamino acetic acid betaine, tetradecyl dimethylamino acetic acid betaine, pentadecyl dimethylamino acetic acid betaine, and hexadecyl dimethylamino acetic acid betaine. These alkyldimethylamino acetic acid betaines may be used alone or in combination of at least two kinds. Among them, decyl dimethylamino acetic acid betaine, lauryl dimethylamino acetic acid betaine, tetradecyl dimethylamino acetic acid betaine are preferred from the viewpoint of enhancing the solubility of nickel oxide, effectively suppressing the corrosion of a Ni—P containing layer, and being readily available industrially. Decyl dimethylamino acetic acid betaine and lauryl dimethylamino acetic acid betaine are more preferred from the same viewpoint.

Another example of the particular amphoteric surfactant is represented by, for example, Formula (3).

[Chemical Formula 9]

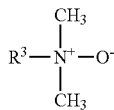
(3)

In Formula (3), $R^3$ is an alkyl group having a carbon number of 10 to 16. However, from the viewpoint of enhancing the solubility of nickel oxide and effectively suppressing the corrosion of the Ni—Pi containing layer, the carbon number is preferably 10 to 14, and more preferably 10 to 12.

The amphoteric surfactant represented by Formula (3) is alkyl dimethylamine oxide, and specific examples thereof include decyl dimethylamine oxide, undecyl dimethylamine oxide, lauryl dimethylamine oxide, tridecyl dimethylamine oxide, tetradecyl dimethylamine oxide, pentadecyl dimethylamine oxide, and hexadecyl dimethylamine oxide. These alkyl dimethylamine oxides may be used alone or in combination of at least two kinds. Among them, decyl dimethylamine oxide, lauryl dim ethylamine oxide, and tetradecyl dimethylamine oxide are preferred from the viewpoint of enhancing the solubility of nickel oxide, effectively suppressing the corrosion of a Ni—P containing layer, and being readily available industrially. Decyl dimethylamine oxide and lauryl dimethylamine oxide are more preferred from the same viewpoint.

Another example of the particular amphoteric surfactant is represented by Formula (4).

[Chemical Formula 10]

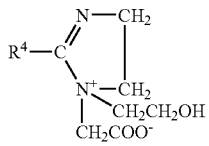
(4)

In Formula (4), $R^4$ is an alkyl group having a carbon number of 10 to 16. However, from the viewpoint of enhancing the solubility of nickel oxide and effectively suppressing the corrosion of a Ni—Pi containing layer, the carbon number is preferably 10 to 14, and more preferably 10 to 12.

The amphoteric surfactant represented by Formula (4) is alkyl carboxymethyl hydroxyethylimidazoliniumbetaine, and specific examples thereof include 2-decyl-N-carboxymethyl-N-hydroxyethylimidazoliumbetaine, 2-undecyl-N-carboxymethyl-N-hydroxyethylimidazoliumbetaine, 2-lauryl-N-carboxymethyl-N-hydroxyethylimidazoliumbetaine, 2-tridecyl-N-carboxymethyl-N-hydroxyethylimidazoliumbetaine, 2-tetradecyl-N-carboxymethyl-N-hydroxyethylimidazoliumbetaine, 2-pentadecyl-N-carboxymethyl-N-hydroxyethylimidazoliumbetaine, and 2-hexadecyl-N-carboxymethyl-N-hydroxyethylimidazoliumbetaine. These alkyl carboxymethyl hydroxyethylimidazoliumbetaines may be used alone or in combination of at least two kinds. Among them, 2-decyl-N-carboxymethyl-N-hydroxyethylimidazoliumbetaine, 2-lauryl-N-carboxymethyl-N-hydroxyethylimidazoliumbetaine, and 2-tetradecyl-N-carboxymethyl-N-hydroxyethylimidazoliumbetaine are preferred from the viewpoint of enhancing the solubility of nickel oxide, effectively suppressing the corrosion of the Ni—P containing layer, and being readily available industrially. 2-decyl-N-carboxymethyl-N-hydroxyethylimidazoliumbetaine, and 2-lauryl-N-carboxymethyl-N-hydroxyethylimidazoliumbetaine are more preferred from the same viewpoint.

Another example of the particular amphoteric surfactant is represented by, for example, Formula (5).

[Chemical Formula 11]

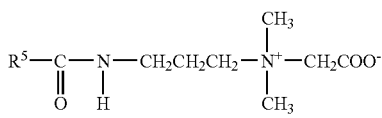
(5)

In Formula (5), $R^5$ is an alkyl group having a carbon number of 10 to 16. However, from the viewpoint of enhancing the solubility of nickel oxide and effectively suppressing the corrosion of a Ni—Pi containing layer, the carbon number is preferably 10 to 14, and more preferably 10 to 12.

The amphoteric surfactant represented by Formula (5) is alkyl amidepropylbetaine, and specific examples thereof include amidepropylbetaine caprate, amidepropylbetaine undecylate, amidepropylbetaine laurate, amidepropylbetaine tridecylate, amidepropylbetaine myristate, amidepropylbetaine pentadecylate, and amidepropylbetaine palmitate. These alkyl amidepropylbetaines may be used alone or in combination of at least two kinds. Among them, amidepropylbetaine caprate, amidepropylbetaine laurate, and amidepropylbetaine myristate are preferred from the viewpoint of enhancing the solubility of nickel oxide, effectively suppressing the corrosion of a Ni—P containing layer, and being readily available industrially. Amidepropylbetaine caprate and amidepropylbetaine laurate are more preferred from the same viewpoint.

Another example of the particular amphoteric surfactant is represented by, for example, Formula (6).

[Chemical Formula 12]

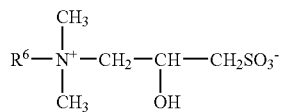

(6)

In Formula (6), $R^6$ is an alkyl group having a carbon number of 10 to 16. From the viewpoint of enhancing the solubility of nickel oxide and effectively suppressing the corrosion of a Ni—Pi containing layer, the carbon number is preferably 10 to 14, and more preferably 10 to 12.

The amphoteric surfactant represented by Formula (6) is alkylhydroxysulfobetaine, and specific examples thereof include decylhydroxysulfobetaine, undecylhydroxysulfobetaine, laurylhydroxysulfobetine, tridecylhydroxysulfobetaine, tetradecylhydroxysulfobetaine, pentadecylhydroxysulfobetaine, and hexadecylhydroxysulfobetaine. These alkylhydroxysulfobetaines may be used alone or in combination of at least two kinds. Among them, decylhydroxysulfobetaine, laurylhydroxysulfobetaine, and tetradecylhydroxysulfobetaine are preferred from the viewpoint of enhancing the solubility of nickel oxide, effectively suppressing the corrosion of a Ni—P containing layer, and being readily available industrially. Decylhydroxysulfobetaine and laurylhydroxysulfobetaine are more preferred from the same viewpoint.

The content of at least one surfactant selected from the group consisting of the surfactants represented by Formulas (1) to (6) in the cleaning composition of the present invention is preferably 0.0005% by weight or more, more preferably 0.001% by weight or more, and much more preferably 0.005% by weight or more from the viewpoint of effectively suppressing the corrosion of a Ni—P containing layer. The content is preferably 0.5% by weight or less, more preferably 0.3% by weight or less, and much more preferably 0.1% by weight or less from the viewpoint of enhancing a rinsing property. Thus, the content is preferably 0.0005 to 0.5% by weight, more preferably 0.001 to 0.3% by weight, and much more preferably 0.005 to 0.1% by weight.

As an aqueous medium contained in the cleaning composition of the present invention, there is water, which herein includes ultra-pure water, pure water, ion exchange water, distilled water, and the like. Among them, ultra-pure water, pure water, and ion exchange water are preferred, ultra-pure water and pure water are more preferred, and ultra-pure water is much more preferred. Herein, pure water and ultra-pure water refer to those which are obtained by allowing tap water to pass through activated carbon, subjecting the obtained tap water to an ion exchange treatment, distilling the water, and irradiating the distilled water with light from a predetermined ultraviolet germicidal lamp or allowing the distilled water to pass through a filter, if required. For example, the electric conductivity at 25° C. is 1 μS/cm or less in pure water and 0.1 μS/cm or less in ultra-pure water in most cases.

The content of the aqueous medium in the cleaning composition of the present invention is preferably 99.5% by weight or more, more preferably 99.7% by weight or more, and much more preferably 99.9% by weight or more from the viewpoint of the stability of the cleaning composition, the workability, and the consideration to the environment such as liquid waste disposability. The content of the aqueous medium is preferably 99.9995% by weight or less, more preferably 99.999% by weight or less, and much more preferably 99.995% by weight or less from the viewpoint of enhancing the solubility of nickel oxide and effectively suppressing the corrosion of a Ni—P containing layer. Thus, the content is preferably 99.5 to 99.9995% by weight, more preferably 99.7 to 99.999% by weight, and much more preferably 99.9 to 99.995% by weight.

The pH at 25° C. of the cleaning composition of the present invention is 5 or less. However, the pH is preferably 4.5 or less, more preferably 4 or less, and much more preferably 3 or less from the viewpoint of the high solubility of a nickel oxide layer. The pH at 25° C. of the cleaning composition of the present invention is preferably 1 or more and more preferably 1.5 or more. The pH is preferably 1 to 4.5, more preferably 1 to 4, much more preferably 1.5 to 4, and still more preferably 1.5 to 3. Herein, the pH at 25° C. can be measured using a pH meter (HM-30G manufactured by DKK-TOA Corporation).

The pH of the cleaning composition is adjusted using a pH adjuster, if required. As the pH adjuster, for example, organic acids such as malic acid, acetic acid, and oxalic acid, inorganic acids such as sulfuric acid and nitric acid, amines such as amino alcohol and alkylamine, and ammonia can be used. The inorganic acid is more preferred than the organic acid for the reason that the inorganic acid is a strong acid and can decrease the pH easily.

The cleaning composition of the present invention may contain a nonionic surfactant, an anionic surfactant, a silicon-based defoaming agent, a chelating agent such as EDTA and organic phosphonic acid, alcohols, a preservative, an antioxidant, and the like as arbitrary components in a range not impairing the effects of the present invention.

Assuming that the total content of the components excluding water in the cleaning composition is 100% by weight, the total of the content of at least one surfactant selected from the group consisting of the surfactants represented by Formulas (1) to (6) and the content of the inorganic acid is preferably 90 to 100% by weight, more preferably 95 to 100% by weight, much more preferably 98 to 100% by weight, and still more preferably 100% by weight for the reason that the effects of the present invention of enhancing the solubility of nickel oxide and effectively suppressing the corrosion of a Ni—P containing layer can be exhibited sufficiently.

A fluorine-containing compound, for example, which makes it difficult to adjust the cleaning composition to a desired pH due to the buffer function regarding pH and needs to be treated in a waste disposal facility, preferably is not contained excessively and more preferably is not contained in the cleaning composition.

There is no particular limit to a method for preparing the cleaning composition of the present embodiment. For example, at least one surfactant selected from the group consisting of the surfactants represented by Formulas (1) to (6) and arbitrary components may be mixed by the addition to water. Then, the mixture may be adjusted to a desired pH by adding a pH adjuster, if required. A known method may be adopted as the mixing method. The order of dissolving each component in water is not particularly limited, either.

The compounding ratio of the respective components described above is the one during use (during cleaning of a substrate). However, the cleaning composition of the present embodiment may be supplied to production, storage, and cleaning steps while being concentrated in a range not impairing the stability thereof.

The content of at least one surfactant selected from the group consisting of the surfactants represented by Formulas (1) to (6) in the cleaning composition at a time of production, storage, and supply is preferably 0.05 to 50% by weight, more preferably 0.1 to 25% by weight, much more preferably 0.5 to 10% by weight, still more preferably 1 to 10% by weight, and still further more preferably 3 to 7% by weight based on the total amount of the cleaning composition, from the viewpoint of ensuring that the cleaning composition is water-soluble and ensuring the satisfactory storage stability.

The content of water in the cleaning composition at a time of storage and supply (that is, in a concentrated state) is preferably 40 to 99.9% by weight, more preferably 50 to 97% by weight, and much more preferably 60 to 95% by weight based on the total amount of the cleaning composition, from the viewpoint of ensuring that the cleaning composition is water-soluble and ensuring the satisfactory storage stability.

(Method for Producing a Perpendicular Magnetic Recording Hard Disk)

A method for producing a perpendicular magnetic recording hard disk of the present invention is a method for producing a perpendicular magnetic recording hard disk including a substrate for a perpendicular magnetic recording hard disk (hereinafter, which may be referred to as a "substrate for a hard disk") and a magnetic layer placed on the substrate for a hard disk, and the method includes a substrate formation step of forming a substrate for a hard disk, a cleaning step of cleaning the substrate for a hard disk, and a magnetic layer formation step of forming a magnetic layer on the substrate for a hard disk.

In the substrate formation step, for example, a metal plate such as an aluminum plate is cut to a disk shape and chamfered. After the disk-shaped metal plate is heat-treated, both principal surfaces thereof are ground and heat-treated again. Next, the entire surface of the metal plate is subjected to, for example, Ni—P plating, followed by heat treatment, whereby a base in which the metal plate is covered with a Ni—P plating coating is formed. After that, one principal surface or both principal surfaces of the base are subjected to a first chemical and mechanical polishing treatment using a polishing composition containing an abrasive such as alumina, and then, subjected to a cleaning treatment using the cleaning composition of the present invention or water. Then, the base is subjected to a second chemical and mechanical polishing treatment using a polishing composition containing an abrasive such as silica, and then, subjected to a cleaning treatment using, for example, the cleaning composition of the present invention. Furthermore, if required, an alkali cleaning treatment may be performed. As described later, the cleaning composition of the present invention is used in the cleaning step performed between the substrate formation step and the magnetic layer formation step. However, the cleaning composition may be used for a cleaning treatment performed in the substrate formation step as described above.

The cleaning composition of the present invention is used in the above cleaning step. In the cleaning step, for example, (a) a substrate for a hard disk to be cleaned is soaked in the cleaning composition of the present invention, and/or (b) the cleaning composition of the present invention is injected to be supplied to the substrate for a hard disk.

In the above-mentioned method (a), there is no particular limit to the soaking conditions of the substrate for a hard disk in the cleaning composition. However, the temperature of the cleaning composition is preferably 20° C. to 100° C. from the viewpoint of safety and operability, and the soaking time is preferably 10 seconds to 30 minutes from the viewpoint of a cleaning property and a production efficiency. Furthermore, in order to remove particles and enhance the dispersibility of the particles, it is preferred that the cleaning composition is provided with an ultrasonic vibration. The frequency of an ultrasonic wave is preferably 20 to 2000 kHz, more preferably 100 to 2000 kHz, and much more preferably 1000 to 2000 kHz.

In the above-mentioned method (b), from the viewpoint of promoting the cleaning property of particles and the solubility of oil components, it is preferred that the cleaning composition supplied with an ultrasonic vibration is injected so as to come into contact with one principal surface or both principal surfaces of a substrate for a hard disk, thereby cleaning the substrate, or that the cleaning composition is supplied to one principal surface or both principal surfaces of a substrate for a hard disk by injection, and one principal surface or both principal surfaces are scrubbed with a cleaning brush. Furthermore, it is preferred that the cleaning composition supplied with an ultrasonic vibration is supplied to one principal surface or both principal surfaces by injection, and one principal surface or both principal surfaces supplied with the cleaning composition are scrubbed with a cleaning brush.

As means for supplying the cleaning composition to one principal surface or both principal surfaces of a substrate for a hard disk, known means such as a spray nozzle can be used. Furthermore, as the cleaning brush, for example, a known brush such as a nylon brush or a PVA sponge brush can be used without any particular limit. The frequency of an ultrasonic wave may be similar to the value adopted preferably in the above-mentioned method (a).

The cleaning method using the cleaning composition of the present invention may include at least one step using a known cleaning method such as oscillation cleaning, cleaning using the rotation of a spinner or the like, or paddle cleaning, in addition to the above-mentioned method (a) and/or method (b).

Examples of the material for a magnetic layer formed on one principal surface of a substrate for a hard disk or magnetic layers formed respectively on both principal surfaces of the substrate for a hard disk include cobalt alloys of cobalt and iron, zirconium, niobium, chromium, tantalum, or platinum. There is no particular limit to a method for forming a magnetic layer, and a conventionally known formation method such as sputtering may be adopted.

In the cleaning using the cleaning composition of the present invention, substrates for a hard disk may be cleaned one by one. However, a plurality of substrates to be cleaned may be cleaned at a time. Furthermore, one or a plurality of cleaning tanks may be used for cleaning.

EXAMPLES

1. Preparation of a Cleaning Composition

Respective components were blended and mixed so as to have compositions shown in Tables 1 and 2, whereby concentrates of cleaning compositions in Examples 1 to 20 and Comparative Examples 1 to 23 were obtained.

2. Evaluation Items

The obtained concentrates of the cleaning compositions were diluted with water so that the concentrations thereof became 1% by weight. Using the diluted solutions (cleaning compositions), a dissolved amount (ppm) of NiO and a corroded amount (Å) of NiP were obtained, and a dissolution selection ratio (dissolved amount of NiO/corroded thickness of NiP) of NiO and NiP was obtained. If the dissolution selection ratio (dissolved amount of NiO/corroded thickness of NiP) of NiO and NiP is large, the nickel oxide layer and the oxide fine particles are removed satisfactorily (that is, the cleaning property is satisfactory), and the corroded amount of NiP is small. It is preferred that the (dissolved amount of NiO/corroded thickness of NiP) is 30 or more, because the cleaning property is more satisfactory. Tables 1 and 2 show the results.

3. Measurement of the Dissolved Amount of NiO

1) Twenty grams of 1% by weight of an aqueous solution (cleaning composition) of a concentrate of the cleaning composition is placed in a polyethylene container with a capacity of 100 ml, and set to be a constant temperature in a temperature-controlled bath at 25° C.

2) Next, 0.1 g of nickel oxide powder (Nickel (II) oxide, nanopowder with a purity of 99.8% by weight, manufactured by SIGMA-ALDRICH Corp.) is added to the cleaning composition, and the mixture is stirred with a stirrer sufficiently for 10 minutes.

3) Ten grams of a supernatant is collected with a syringe and filtered through a syringe filter (DISMIC 25HP020AN with a pore diameter of 0.2 µm, manufactured by ADVANTEC Mfg. Inc.), and a filtrate is collected.

4) The filtrate collected in 3) is diluted by 10 to 50 times with ultra-pure water, and the emission intensity of nickel is measured by an ICP emission analysis apparatus ("Optima 5300" (Tradename) manufactured by PerkinElmer Japan Co., Ltd.).

5) The dissolved amount of NiO is obtained from the Ni dissolved amount quantified using the ICP emission analysis apparatus and the calibration curve created using a diluent obtained by diluting a NiO aqueous solution (for atomic absorption analysis) with ultra-pure water at a known concentration.

4. Measurement of a Corroded Thickness of NiP

1) Seventy grams of 1% by weight of an aqueous solution (cleaning composition) of a concentrate of the cleaning composition is placed in a polyethylene container with a capacity of 2 L, and set to be a constant temperature in a temperature-controlled bath at 25° C. to obtain a test solution.

2) Next, a substrate for a hard disk plated with Ni—P is soaked in 0.1% by weight of an HF aqueous solution at room temperature for 10 seconds, and rinsed with water. After that, the substrate is dried by a nitrogen blow, whereby the substrate is pre-cleaned.

3) The pre-cleaned substrate for a hard disk is soaked in the test solution for 10 minutes.

4) The substrate for a hard disk is taken out, and then, the emission intensity of nickel is measured by an ICP emission analysis apparatus ("Optima 5300" (Tradename) manufactured by PerkinElmer Japan Co., Ltd.) regarding the test solution.

5) The NiP corroded thickness is obtained by substituting the Ni dissolved amount quantified using the ICP emission analysis apparatus in the following equation.

$$\text{Corroded thickness [Å] of NiP} = [(A + A \times B)/1000000] \times C/D/E/0.00000001$$

A: Ni dissolved amount [ppm]
B: P/Ni ratio in plating [0.12/0.88]
C: Amount of a test solution [70 g]
D: P/Ni specific gravity [8.4 g/cm$^3$]
E: Substrate area [131.88 cm$^2$]

It is preferred that the corroded thickness of NiP is as thin as possible from the viewpoint of enhancing the yield of a substrate to be cleaned, that has been cleaned using the cleaning composition.

5. Cleaning Property Test of a Substrate to be Cleaned 5-1. Preparation of a Substrate to be Cleaned A Ni—P plated substrate (outer diameter: 95 mmφ, inner diameter: 25 mmφ), thickness: 1.27 mm, surface roughness (Ra): 1 nm) obtained by previously polishing roughly with a slurry containing an alumina abrasive was further polished under the following polishing conditions, and the substrate thus obtained was used as a substrate to be cleaned.

<Polishing Conditions>
Polishing machine: double-sided 9B polishing machine (manufactured by SPEEDFAM Co. Ltd.)
Polishing pad: suede type (thickness: 0.9 mm, average opening diameter: 30 µm, manufactured by Fujibo Co., Ltd.)
Polishing solution: colloidal silica slurry (Product No.: MEMOLEAD 2P-2000, manufactured by Kao Corporation)
Main polishing: load of 100 g/cm$^2$, time of 300 seconds, polishing solution flow rate of 100 mL/min
Water rinsing: load of 30 g/cm$^2$, time of 20 seconds, rinse water flow rate of about 2 L/min 5-2. Cleaning Test A substrate to be cleaned was cleaned by a cleaning apparatus under the following conditions.

(1) Cleaning: A substrate to be cleaned after polishing was cleaned by being soaked in a cleaning composition obtained by diluting a concentrate of a cleaning composition to 1% for 5 minutes.

(2) Rinsing: The substrate to be cleaned was set in a cleaning machine, and transported to a roll brush portion (first stage). Then, a rotating roll brush was pressed against each of the principal surfaces of the substrate, and the substrate was cleaned for 20 seconds while ultra-pure water at room temperature was injected to each of the principal surfaces of the substrate by 1.2 L per minute. Furthermore, the substrate was transported to another roll brush portion (second stage). Then, the rotating roll brush was pressed against each of the principal surfaces of the substrate in the same way as in the roll brush portion in the first stage, and the substrate was rinsed for 20 seconds while ultra-pure water at room temperature was injected to each of both the principal surfaces of the substrate by 1.2 L per minute. After that, the substrate was transported to an ultrasonic rinsing portion, and was rinsed for 20 seconds while ultra-pure water at room temperature supplied with an ultrasonic wave of 950 kHz was injected to each of the principal surfaces of the substrate by 2.7 L per minute.

(3) Drying: The rinsed substrate held by a spin chuck was rotated at a high speed (3000 rpm) to perform drip-drying for one minute.

5-3. Evaluation of a Cleaning Property of Particles

The cleaning property of fine particles on the surface of the substrate obtained through 5-2. (1) to (3) was evaluated by the following method.

The dried substrate was observed using a scanning electron microscope with a magnification of 1000 times (viewing field range: about 100 µm per side), and the number of fine particles remaining on the surface of the substrate observed in the observation viewing field was counted. This observation was performed regarding 5 substrates at 10 points randomly on both the principal surfaces of each substrate (100 points in total (10 points×2×5=100 points)). The cleaning property of fine particles was evaluated in four stages based on the total number of fine particles at the observed 100 points and the following evaluation standard.

<Evaluation Standard for Cleaning Property of Fine Particles>

⊚: the total number of fine particles is 0.
○: the total number of fine particles is 1 to 2.
Δ: the total number of fine particles is 3 to 5.
X: the total number of fine particles is 6 or more.

As the recording density of a hard disk increases, the requested cleaning precision is enhanced. However, the cleaning composition whose cleaning property is evaluated as Δ may be used, and the cleaning composition whose cleaning property is evaluated as ○ can satisfy the current required level. In the future, even in the case where the requested cleaning precision is enhanced further, the cleaning composition whose cleaning property is evaluated as ⊚ can satisfy such a request.

As shown in Tables 1 and 2, in order for the above-mentioned cleaning property to be ○ or ⊚, the dissolved amount of NiO may be 80 ppm or more, and in order for the above-mentioned cleaning property to be ⊚, the dissolved amount of NiO is 200 ppm or more, preferably 250 ppm or more, more preferably 300 ppm or more, much more preferably 350 ppm or more, and still more preferably 400 ppm or more. As described above, it is understood that, if a cleaning composition containing at least one surfactant selected from the group consisting of the surfactants represented by Formulas (1) to (6) and having a pH at 25° C. of 5 or less is used, a highly cleaned substrate can be obtained while the corrosion of a Ni—P containing layer is suppressed.

TABLE 1

| | | Surfactant |
|---|---|---|
| Comparative Example 1 | Amphoteric surfactant | None |
| Comparative Example 2 | | $(CH_3)_3NCH_2CO_2$ (betaine) |
| Example 1 | | Lauryl dimethylamino acetic acid betaine (Anhitol 24B, manufactrured by Kao Corporation) (Formula (2)) |
| Example 2 | | Lauryl dimethylamine oxide (Anhitol 20N, manufactured by Kao Corporation) (Formula (3)) |
| Example 3 | | 2-alkyl-N-carboxymethyl-N-hydroxyethylimidazoliumbetaine[X.3] (Anhitol 20YB, manufactued by Kao Corporation) (Formula (4)) |
| Example 4 | | Amidepropylbetaine laurate (Anhitol 20AB, manufactured by Kao Corporation) (Formula (5)) |
| Example 5 | | Laurylhydroxysulfobetaine (Anhitol 20HD, manufactued by Kao Corporation) (Formula (6)) |
| Example 6 | | Lauryl dimethylamino acetic acid betaine (Anhitol 24B, manufactured by Kao Corporation) (Formula (2)) |
| Example 10 | | Lauryl dimethylamino acetic acid betaine (Anhitol 24B, manufactured by Kao Corporation) (Formula (2)) |
| Example 11 | | Lauryl dimethylamino acetic acid betaine (Anhitol 24B, manufactured by Kao Corporation) (Formula (2)) |
| Example 12 | | Lauryl dimethylamino acetic acid betaine (Anhitol 24B, manufactured by Kao Corporation) (Formula (2)) |
| Comparative Example 21 | | Lauryl dimethylamino acetic acid betaine (Anhitol 24B, manufactured by Kao Corporation) (Formula (2)) |
| Comparative Example 22 | | Lauryl dimethylamino acetic acid betaine (Anhitol 24B, manufactured by Kao Corporation) (Formula (2)) |
| Example 13 | | Lauryl dimethylamino acetic acid betaine (Anhitol 24B, manufactured by Kao Corporation) (Formula (2)) |
| Example 14 | | Lauryl dimethylamino acetic acid betaine (Anhitol 24B, manufactured by Kao Corporation) (Formula (2)) |
| Example 15 | | Lauryl dimethylamino acetic acid betaine (Anhitol 24B, manufactured by Kao Corporation) (Formula (2)) |
| Example 16 | | Lauryl dimethylamino acetic acid betaine (Anhitol 24B, manufactured by Kao Corporation) (Formula (2)) |
| Example 17 | | Lauryl dimethylamino acetic acid betaine (Anhitol 24B, manufactured by Kao Corporation) (Formula (2)) |
| Example 18 | | Lauryl dimethylamino acetic acid betaine (Anhitol 24B, manufactured by Kao Corporation) (Formula (2)) |
| Example 19 | | Lauryl dimethylamino acetic acid betaine (Anhitol 24B, manufactured by Kao Corporation) (Formula (2)) |
| Comparative Example 23 | | Octyl dimethylamine oxide (GENAMINOX OC, manufactured by Clariant (Japan) K.K.) |
| Example 20 | | Decyl dimethylamine oxide (GENAMINOX K-10, manufactured by Clariant (Japan) K.K) (Formula (3)) |
| Comparative Example 3 | | Stearyl dimethylamino acetic acid betaine Anhitol 86B, manufactued by Kao Corporation) |
| Comparative Example 4 | Amino acid | $H_2NCH_2CO_2H$ (glycin) |

| | | | Concentrate for cleaning composition (Solid content conversion) | | | | |
|---|---|---|---|---|---|---|---|
| | Acid/Base | Acid/base (wt %) | Surfactant (wt %) | Additive (wt %) | Water (wt %) | Total | pH |
| Comparative Example 1 | Sulfuric acid | 9.00 | | | 91.00 | 100.00 | 0.13 |
| Comparative Example 2 | Sulfuric acid | 9.00 | 5.00 | | 86.00 | 100.00 | 0.31 |
| Example 1 | Sulfuric acid | 9.00 | 5.00 | | 86.00 | 100.00 | 0.21 |
| Example 2 | Sulfuric acid | 9.00 | 5.00 | | 86.00 | 100.00 | 0.18 |
| Example 3 | Sulfuric acid | 9.00 | 5.00 | | 86.00 | 100.00 | 0.16 |

TABLE 1-continued

| | | | | | | | |
|---|---|---|---|---|---|---|---|
| Example 4 | Sulfuric acid | 9.00 | 5.00 | | 86.00 | 100.00 | 0.18 |
| Example 5 | Sulfuric acid | 6.60 | 5.00 | | 88.40 | 100.00 | 0.19 |
| Example 6 | Sulfuric acid | 4.75 | 5.00 | 0.60[X2] | 89.65 | 100.00 | 0.60 |
| Example 10 | Sulfuric acid | 9.00 | 5.00 | | 86.00 | 100.00 | 3.06 |
| Example 11 | Malic acid | 9.00 | 5.00 | | 86.00 | 100.00 | 2.28 |
| Example 12 | Acetic acid | 4.50 | 5.00 | | 89.40 | 100.00 | 4.10 |
| | Monoethanol amine | 1.10 | | | | | |
| Comparative Example 21 | DHEG[X1] | 9.00 | 5.00 | | 86.00 | 100.00 | 5.76 |
| Comparative Example 22 | KOH | 2.40 | 5.00 | | 92.60 | 100.00 | 13.44 |
| Example 13 | Sulfuric acid | 9.00 | 0.05 | | 90.95 | 100.00 | 0.26 |
| Example 14 | Sulfuric acid | 9.00 | 0.15 | | 90.85 | 100.00 | 0.22 |
| Example 15 | Sulfuric acid | 9.00 | 0.60 | | 90.40 | 100.00 | 0.22 |
| Example 16 | Sulfuric acid | 9.00 | 1.70 | | 89.30 | 100.00 | 0.21 |
| Example 17 | Sulfuric acid | 9.00 | 9.00 | | 82.00 | 100.00 | 0.21 |
| Example 18 | Sulfuric acid | 9.00 | 24.00 | | 67.00 | 100.00 | 0.24 |
| Example 19 | Sulfuric acid | 9.00 | 49.00 | | 42.00 | 100.00 | 0.38 |
| Comparative Example 23 | Sulfuric acid | 9.00 | 5.00 | | 86.00 | 100.00 | 0.32 |
| Example 20 | Sulfuric acid | 9.00 | 5.00 | | 86.00 | 100.00 | 0.27 |
| Comparative Example 3 | Sulfuric acid | | | | | | Insoluble |
| Comparative Example 4 | Sulfuric acid | 9.00 | 5.00 | | 86.00 | 100.00 | 0.47 |

| | 1% diluted product of concentrate | | | | | | | | |
|---|---|---|---|---|---|---|---|---|---|
| | Acid/base (wt %) | Surfactant (wt %) | Additive (wt %) | Water (wt %) | NiO dissolved amount (ppm) | Corroded thickness of NiP (Å) | NiO/NiP[X4] | pH | Cleaning property |
| Comparative Example 1 | 0.0900 | | | 99.9100 | 388.7 | 15.2 | 25.5 | 1.88 | ☺ |
| Comparative Example 2 | 0.0900 | 0.0500 | | 99.8600 | 355.2 | 16.1 | 22.1 | 1.98 | ☺ |
| Example 1 | 0.0900 | 0.0500 | | 99.8600 | 361.1 | 4.6 | 78.8 | 1.84 | ☺ |
| Example 2 | 0.0900 | 0.0500 | | 99.8600 | 357.2 | 7.2 | 49.7 | 1.88 | ☺ |
| Example 3 | 0.0900 | 0.0500 | | 99.8600 | 332.0 | 3.7 | 88.8 | 1.83 | ☺ |
| Example 4 | 0.0900 | 0.0500 | | 99.8600 | 351.2 | 5.7 | 61.9 | 1.91 | ☺ |
| Example 5 | 0.0660 | 0.0500 | | 99.8840 | 315.6 | 7.8 | 40.5 | 2.11 | ☺ |
| Example 6 | 0.0475 | 0.0500 | 0.006 | 99.9025 | 301.0 | 4.3 | 70.0 | 2.2 | ☺ |
| Example 10 | 0.0900 | 0.0500 | | 99.8600 | 100.9 | 5.8 | 17.5 | 3.41 | ○ |
| Example 11 | 0.0900 | 0.0500 | | 99.8600 | 137.9 | 6.1 | 22.6 | 2.91 | ○ |
| Example 12 | 0.0450 0.0110 | | | 99.8940 | 92.2 | 4.0 | 23.1 | 4.23 | ○ |
| Comparative Example 21 | 0.0900 | 0.0500 | | 99.8600 | 76.8 | 4.2 | 18.2 | 5.62 | Δ |
| Comparative Example 22 | 0.0240 | 0.0500 | | 99.9260 | 0.0 | 0.3 | 0.0 | 11.7 | X |
| Example 13 | 0.0900 | 0.0005 | | 99.9095 | 388.7 | 9.5 | 40.9 | 1.93 | ☺ |
| Example 14 | 0.0900 | 0.0015 | | 99.9085 | 403.7 | 8.0 | 50.5 | 1.86 | ☺ |
| Example 15 | 0.0900 | 0.0060 | | 99.9040 | 460.0 | 5.1 | 91.0 | 1.84 | ☺ |
| Example 16 | 0.0900 | 0.0170 | | 99.8930 | 443.3 | 4.8 | 91.6 | 1.93 | ☺ |
| Example 17 | 0.0900 | 0.0900 | | 99.8200 | 364.3 | 6.5 | 55.7 | 1.93 | ☺ |
| Example 18 | 0.0900 | 0.2400 | | 99.6700 | 344.6 | 7.1 | 48.8 | 2.02 | ☺ |
| Example 19 | 0.0900 | 0.4900 | | 99.4200 | 337.4 | 6.9 | 48.6 | 2.02 | ☺ |
| Comparative Example 23 | 0.0900 | 0.0500 | | 99.8600 | 343.0 | 13.7 | 25.0 | 1.95 | ☺ |
| Example 20 | 0.0900 | 0.0500 | | 99.8600 | 321.1 | 7.0 | 45.9 | 1.94 | ☺ |
| Comparative Example 3 | | | | | | | | | |
| Comparative Example 4 | 0.0900 | 0.0500 | | 99.8600 | 375.4 | 13.5 | 27.9 | 2.11 | ☺ |

[X1] Dihydroxyethylglycin
[X2] 1-hydroxyethylidene-1,1-diphosphonic acid
[X3] The caron number of R4 in 2-alkyl-N-carboxymethyl-N-hydroxyethylimidazoliumbetaine is 12~16
[X4] NiO dissolved amount/NiP corroded thickness

TABLE 2

| | Surfactant | |
|---|---|---|
| Comparative Example 5 | Cationic | Stearyltrimethylammonium chloride (C18) |
| Example 7 | surfactant | Hexadecyltrimethylammonium chloride (C16) |
| Example 8 | (quaternary | Lauryltrimethylammonium chloride (C12) |
| Example 9 | ammonium | Decyltrimethylammonium chloride (C10) |
| Comparative Example 6 | salt) | Octyltrimethylammonium chloride (C8) |
| Comparative Example 7 | | Tetramethylammonium hydroxide (TMAH) |
| Comparative Example 8 | Amine | Stearylamine |
| Comparative Example 9 | | N-methyloctadecylamine |
| Comparative Example 10 | | N,N-dimethyloctadecylamine |
| Comparative Example 11 | | Hexylamine |
| Comparative Example 12 | | Octylamine |
| Comparative Example 13 | | Decylamine |
| Comparative Example 14 | | Dodecylamine |

TABLE 2-continued

| | | |
|---|---|---|
| Comparative Example 15 | Other surfactants | Butylnaphthalene sulfonic acid Na (Pellex NB-L, manufactured by Kao Corporation) |
| Comparative Example 16 | | Ammonium lauryl sulfate (C10-16) (Emal AD-25R, manufactured by Kao Corporation) |
| Comparative Example 17 | | Polyoxyethylene (3) lauryl ether sulfuric acid Na (Emal 20C, manufactured by Kao Corporation) |
| Comparative Example 18 | | Polyoxyethylene(10) polyoxypropylene(1.5) lauryl-myristyl ether (Emalgen LS-110, manufactued by Kao Corporation) |
| Comparative Example 19 | | Polyoxyethylene (23) lauryl ether (Emalgen 123P, manufactued by Kao Corporation) |
| Comparative Example 20 | | Naphthalenesulfonic acid, polymer with formaldehyde, sodium salt (Demol NL, manufactured by Kao Corporation) |

| | | Concentrate for cleaning composition (Solid content conversion) | | | | | |
|---|---|---|---|---|---|---|---|
| | Acid/base | Acid/base (wt %) | Surfactant (wt %) | Additive (wt %) | Water (wt %) | Total | pH |
| Comparative Example 5 | Sulfuric acid | | | | | | Insoluble |
| Example 7 | Sulfuric acid | 9.00 | 5.00 | | 86.00 | 100.00 | 0.11 |
| Example 8 | Sulfuric acid | 9.00 | 5.00 | | 86.00 | 100.00 | 0.09 |
| Example 9 | Sulfuric acid | 9.00 | 5.00 | | 86.00 | 100.00 | 0.1 |
| Comparative Example 6 | Sulfuric acid | 9.00 | 5.00 | | 86.00 | 100.00 | 0.13 |
| Comparative Example 7 | Sulfuric acid | 9.00 | 5.00 | | 86.00 | 100.00 | 0.17 |
| Comparative Example 8 | Sulfuric acid | | | | | | Insoluble |
| Comparative Example 9 | Sulfuric acid | | | | | | Insoluble |
| Comparative Example 10 | Sulfuric acid | | | | | | Insoluble |
| Comparative Example 11 | Sulfuric acid | 14.05 | 5.00 | | 80.95 | 100.00 | 0.19 |
| Comparative Example 12 | Sulfuric acid | 9.10 | 5.00 | | 85.90 | 100.00 | 0.19 |
| Comparative Example 13 | Sulfuric acid | | | | | | Insoluble |
| Comparative Example 14 | Sulfuric acid | | | | | | Insoluble |
| Comparative Example 15 | Sulfuric acid | 9.00 | 5.00 | | 86.00 | 100.00 | 0.15 |
| Comparative Example 16 | Sulfuric acid | 9.00 | 5.00 | | 86.00 | 100.00 | 0.19 |
| Comparative Example 17 | Sulfuric acid | 9.00 | 5.00 | | 86.00 | 100.00 | 0.18 |
| Comparative Example 18 | Sulfuric acid | 9.00 | 5.00 | | 86.00 | 100.00 | 0.19 |
| Comparative Example 19 | Sulfuric acid | 9.00 | 5.00 | | 86.00 | 100.00 | 0.17 |
| Comparative Example 20 | Sulfuric acid | 9.00 | 5.00 | | 86.00 | 100.00 | 0.18 |

| | 1% diluted product of concentrate | | | | | | | | |
|---|---|---|---|---|---|---|---|---|---|
| | Acid/base (wt %) | Surfactant (wt %) | Additive (wt %) | Water (wt %) | NiO dissolved amount (ppm) | Corroded thickness of NiP (Å) | NiO/NiP※4 | pH | Cleaning property |
| Comparative Example 5 | | | | | | | | | |
| Example 7 | 0.0900 | 0.0500 | | 99.8600 | 336.5 | 9.3 | 36.2 | 1.90 | ◎ |
| Example 8 | 0.0900 | 0.0500 | | 99.8600 | 371.2 | 9.6 | 38.7 | 1.90 | ◎ |
| Example 9 | 0.0900 | 0.0500 | | 99.8600 | 378.1 | 9.9 | 38.2 | 1.90 | ◎ |
| Comparative Example 6 | 0.0900 | 0.0500 | | 99.8600 | 295.6 | 14.6 | 20.2 | 1.94 | ◎ |
| Comparative Example 7 | 0.0900 | 0.0500 | | 99.8600 | 401.8 | 14.4 | 28.0 | 1.85 | ◎ |
| Comparative Example 8 | | | | | | | | | |
| Comparative Example 9 | | | | | | | | | |
| Comparative Example 10 | | | | | | | | | |
| Comparative Example 11 | 0.1405 | 0.0500 | | 99.8095 | 393.7 | 16.0 | 24.6 | 1.84 | ◎ |
| Comparative Example 12 | 0.0910 | 0.0500 | | 99.8590 | 400.5 | 15.2 | 26.3 | 1.83 | ◎ |
| Comparative Example 13 | | | | | | | | | |
| Comparative Example 14 | | | | | | | | | |
| Comparative Example 15 | 0.0900 | 0.0500 | | 99.8600 | 372.4 | 14.3 | 26.0 | 1.84 | ◎ |
| Comparative Example 16 | 0.0900 | 0.0500 | | 99.8600 | 356.5 | 13.8 | 25.8 | 1.87 | ◎ |
| Comparative Example 17 | 0.0900 | 0.0500 | | 99.8600 | 378.9 | 15.0 | 25.3 | 1.85 | ◎ |
| Comparative Example 18 | 0.0900 | 0.0500 | | 99.8600 | 347.3 | 14.5 | 24.0 | 1.95 | ◎ |
| Comparative Example 19 | 0.0900 | 0.0500 | | 99.8600 | 364.4 | 13.5 | 27.0 | 1.92 | ◎ |
| Comparative Example 20 | 0.0900 | 0.0500 | | 99.8600 | 332.1 | 14.4 | 23.0 | 1.88 | ◎ |

※4NiO dissolved amount/NiP corroded thickness

As described above, according to the present invention, a cleaning composition for a substrate for a perpendicular magnetic recording hard disk having a high cleaning ability while suppressing the corrosion of a Ni—P containing layer, and a method for producing a perpendicular magnetic recording hard disk using the cleaning composition can be provided.

INDUSTRIAL APPLICABILITY

A substrate for a perpendicular magnetic recording hard disk is cleaned using the cleaning composition of the present invention, whereby a nickel oxide layer and oxide fine particles can be removed while the corrosion of a Ni—P containing layer is suppressed. Thus, the present invention can contribute to the enhancement of a production yield.

The invention claimed is:

1. A method for producing a perpendicular magnetic recording hard disk including a substrate for a perpendicular magnetic recording hard disk having Ni—P containing layers as both outermost layers and a magnetic layer placed on one principal surface of the substrate for a hard disk or magnetic layers placed respectively on both principal surfaces of the substrate for a hard disk, the method comprising:
- a substrate formation step of forming the substrate for a hard disk;
- a cleaning step of cleaning the substrate for a hard disk; and
- a step of forming at least one of the magnetic layers,
- wherein the substrate formation step includes:
  - a step of forming a base in which a metal plate is covered with a Ni—P plating coating;
  - a step of subjecting a principal surface of the base to a chemical and mechanical polishing treatment using a polishing composition containing an abrasive; and
  - a step of subjecting the base to a cleaning treatment after the chemical and mechanical polishing treatment, and
- wherein the substrate for a hard disk or the base is cleaned using an aqueous cleaning composition for a substrate for a perpendicular magnetic recording hard disk having Ni—P containing layers in the cleaning step performed between the substrate formation step and the step of forming at least one of the magnetic layers or the step of subjecting the base to a cleaning treatment performed in the substrate formation step,
- wherein the aqueous cleaning composition consists of a surfactant, water, an inorganic acid, and a component to be added arbitrarily,
- the aqueous cleaning composition does not comprise an abrasive,
- the aqueous cleaning composition has a pH at 25° C. of 5 or less,
- wherein the surfactant is at least one selected from the group consisting of: a cationic surfactant represented by the following Formula (1), an amphoteric surfactant represented by the following Formula (2), an amphoteric surfactant represented by the following Formula (3), an amphoteric surfactant represented by the following Formula (4), an amphoteric surfactant represented by the following Formula (5), and an amphoteric surfactant represented by the following Formula (6),
- wherein the component is at least one selected from the group consisting of a nonionic surfactant, an anionic surfactant, a silicon-based defoaming agent, a chelating agent, alcohols, a preservative and an antioxidant, and
- wherein assuming that a total of contents of components excluding the water is 100% by weight, a total of a content of the surfactant and a content of the inorganic acid is 90 to 100% by weight;

[Chemical Formula 1]

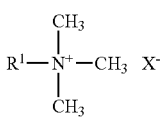

(1)

in Formula (1), $R^1$ is an alkyl group having a carbon number of 10 to 16, and X is a halogen atom,

[Chemical Formula 2]

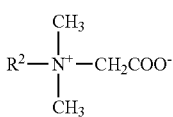

(2)

in Formula (2), $R^2$ is an alkyl group having a carbon number of 10 to 16,

[Chemical Formula 3]

(3)

in Formula (3), $R^3$ is an alkyl group having a carbon number of 10 to 16,

[Chemical Formula 4]

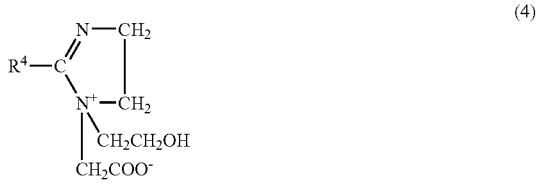

(4)

in Formula (4), $R^4$ is an alkyl group having a carbon number of 10 to 16,

[Chemical Formula 5]

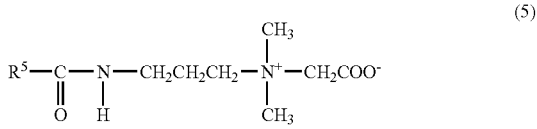

(5)

in Formula (5), $R^5$ is an alkyl group having a carbon number of 10 to 16,

[Chemical Formula 6]

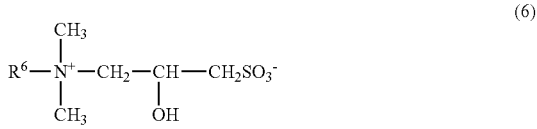

(6)

in Formula (6), $R^6$ is an alkyl group having a carbon number of 10 to 16.

2. The method for producing a perpendicular magnetic recording hard disk according to claim 1, wherein in the substrate formation step, one principal surface or both principal surfaces of a base of the substrate for a hard disk are subjected to a polishing treatment and a cleaning treatment in this order, and
the cleaning treatment is performed using the aqueous cleaning composition for a substrate for a perpendicular magnetic recording hard disk.

3. The method for producing a perpendicular magnetic recording hard disk according to claim 1, wherein the aqueous cleaning composition does not comprise a fluorine-containing compound.

4. The method for producing a perpendicular magnetic recording hard disk according to claim 3, wherein a content of the surfactant is 0.0005 to 0.1% by weight.

5. The method for producing a perpendicular magnetic recording hard disk according to claim 1, wherein a content of the surfactant is 0.0005 to 0.1% by weight.

6. The method for producing a perpendicular magnetic recording hard disk according to claim 1, wherein the pH at 25° C. of the aqueous cleaning composition is 1.5 to 3.

* * * * *